United States Patent
Inamdar et al.

(10) Patent No.: US 8,645,764 B2
(45) Date of Patent: Feb. 4, 2014

(54) DIAGNOSTIC FRAMEWORK FOR USE WITH APPLICATION SERVERS AND VIRTUAL MACHINES

(75) Inventors: Rajendra Inamdar, N. Chelmsford, MA (US); Anthony G. Vlatas, Brookline, NH (US); Sandeep Shrivastava, Westford, MA (US); Michael Cico, Hampton, NH (US); Akbar Ali Ansari, Hopkinton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 210 days.

(21) Appl. No.: 13/111,612

(22) Filed: May 19, 2011

(65) Prior Publication Data

US 2012/0159248 A1  Jun. 21, 2012

Related U.S. Application Data

(60) Provisional application No. 61/424,588, filed on Dec. 17, 2010.

(51) Int. Cl.
 *G06F 11/00* (2006.01)
(52) U.S. Cl.
 USPC ............................. 714/39; 709/223; 709/224
(58) Field of Classification Search
 USPC .......................................................... 714/39
 See application file for complete search history.

(56) References Cited

U.S. PATENT DOCUMENTS

| | | | | |
|---|---|---|---|---|
| 6,272,437 | B1 * | 8/2001 | Woods et al. | 702/35 |
| 6,594,590 | B2 * | 7/2003 | Woods et al. | 702/35 |
| 6,901,352 | B2 * | 5/2005 | Woods et al. | 702/189 |
| 7,047,153 | B2 * | 5/2006 | Woods et al. | 702/163 |
| 2004/0153823 | A1 * | 8/2004 | Ansari | 714/38 |
| 2004/0236805 | A1 * | 11/2004 | Gordon | 707/205 |
| 2004/0249914 | A1 * | 12/2004 | Flocken et al. | 709/223 |
| 2005/0261875 | A1 * | 11/2005 | Shrivastava et al. | 702/183 |
| 2005/0261878 | A1 * | 11/2005 | Shrivastava et al. | 702/186 |
| 2005/0261879 | A1 * | 11/2005 | Shrivastava et al. | 702/186 |
| 2005/0273490 | A1 * | 12/2005 | Shrivastava et al. | 709/203 |
| 2005/0273667 | A1 * | 12/2005 | Shrivastava et al. | 714/38 |
| 2007/0211739 | A1 * | 9/2007 | Schrock | 370/401 |
| 2011/0107003 | A1 * | 5/2011 | Kang et al. | 710/313 |

* cited by examiner

*Primary Examiner* — Kamini Patel
(74) *Attorney, Agent, or Firm* — Fliesler Meyer LLP (57) ABSTRACT

Described herein are systems and methods for providing diagnostic information between an application server (e.g., a WebLogic server), and a virtual machine (VM) (e.g., a JRockit VM). In accordance with an embodiment, the system includes a diagnostic monitoring component adapted to obtain diagnostic data indicative of all available data on an application server, including diagnostic information from one or more application server components running on the application server, obtain diagnostic data from the virtual machine, and persists the diagnostic data obtained from the application server and the virtual machine into a diagnostic data image file. The system further includes a console that provides access to the diagnostic data persisted into the diagnostic image file.

20 Claims, 4 Drawing Sheets

DIAGNOSTIC FRAMEWORK FOR USE WITH APPLICATION SERVERS AND VIRTUAL MACHINES

CLAIM OF PRIORITY

This application claims the benefit of priority to U.S. Provisional Patent Application No. 61/424,588, titled "DIAGNOSTIC FRAMEWORK FOR USE WITH APPLICATION SERVERS AND VIRTUAL MACHINES", filed Dec. 17, 2010, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems and application servers, and are particularly related to systems and methods for providing diagnostic information between an application server and a virtual machine or other system.

BACKGROUND

Enterprise-class computer servers are becoming increasingly sophisticated and complex, which poses a greater need to monitor system health, and prevent unintended system interruptions. Traditionally, system administrators log system activity, and use this knowledge to estimate system health. However, this approach is not as useful in fast-changing environments, which may include application servers and virtual machines. These are the areas that embodiments of the invention are intended to address.

SUMMARY

Described herein are systems and methods for providing diagnostic information between an application server (e.g., a WebLogic server), and a virtual machine (VM) (e.g., a JRockit VM). In accordance with an embodiment, the system includes a diagnostic monitoring component adapted to obtain diagnostic data indicative of all available data on an application server, including diagnostic information from one or more application server components running on the application server, obtain diagnostic data from the virtual machine, and persists the diagnostic data obtained from the application server and the virtual machine into a diagnostic data image file. The system further includes a console that provides access to the diagnostic data persisted into the diagnostic image file.

DETAILED DESCRIPTION

Described herein are systems and methods for providing diagnostic information between an application server (e.g., a WebLogic server), and a virtual machine (VM) (e.g., a JRockit VM). In accordance with an embodiment, the system includes a diagnostic monitoring component adapted to obtain diagnostic data indicative of all available data on an application server, including diagnostic information from one or more application server components running on the application server, obtain diagnostic data from the virtual machine, and persists the diagnostic data obtained from the application server and the virtual machine into a diagnostic data image file. The system further includes a console that provides access to the diagnostic data persisted into the diagnostic image file.

Figure 1:
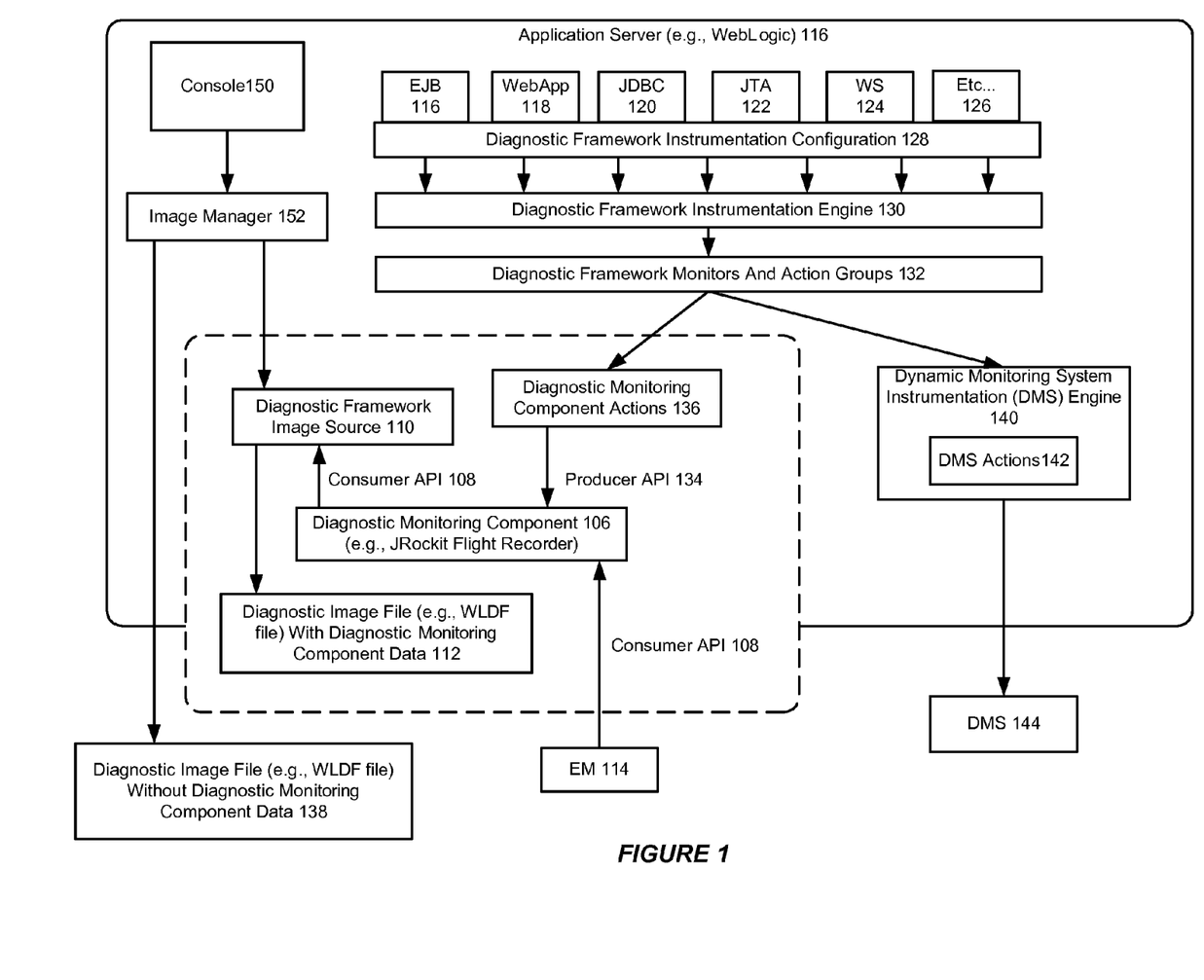
FIG. 1 shows an exemplary diagnostic system for providing diagnostic information between an application server and a virtual machine or other system in accordance with an embodiment.

FIG. 1 is an illustration of a diagnostic framework (e.g., the WebLogic Diagnostic Framework (WLDF) or another type of diagnostic framework) for capturing diagnostic information from a diagnostic monitoring component in a diagnostic image file, and for providing diagnostic information from an application server, application server components, and/or an enterprise manager (e.g., Oracle Enterprise Manager) to a diagnostic monitoring component. As shown in FIG. 1, the system includes a diagnostic monitoring component 106 (referred to herein in some embodiments as "JRockit Flight Recorder"), and APIs that can be used to both retrieve diagnostic information from, and provide diagnostic information to, the diagnostic monitoring component. A consumer API can be used to capture diagnostic information from the diagnostic monitoring component into a diagnostic framework image source 110, which can then be persisted into a diagnostic image file 112, such as a WLDF image file. The consumer API can also be used to capture diagnostic information from an enterprise manager (EM) 114.

In accordance with an embodiment, diagnostic information can also be provided from the application server (e.g., a WebLogic Application server) 116 or components on the application server such as EJBs 118, web applications 120, JDBC 122, JTA 124, WS 126 and other resources 128 to the diagnostic monitoring component. For example, the diagnostic framework instrumentation configuration 128, instrumentation engine 130, and monitors and actions groups 132, can be configured to obtain diagnostic information from the application server and/or the application server components. A producer API 134 can be used to obtain such diagnostic information and feed it to, e.g., the JRockit Flight Recorder, for further use by that product.

In accordance with an embodiment, diagnostic information at the diagnostic monitoring component can be captured as a separate file having a file name of, e.g., "JRockitFlightRecorder.jfr". The diagnostic image file then contains the diagnostic information from the diagnostic monitoring component (e.g., JRockit Flight Recorder), and the diagnostic information provided by the diagnostic framework (e.g., WLDF). The data from the diagnostic monitoring component can be defined in a unique format, e.g., a JRockit format, which can be directly consumed by tools understanding that format. The contents of the JRockitFlightRecorder.jfr can contain all available diagnostic information from the JRockit, and can depend on a data gathering volume used by the diagnostic monitoring component. If Flight Recording is not installed, or is disabled, the diagnostic image file 138 will contain only data obtained from the regular WLDF diagnostic framework.

In accordance with an embodiment, other monitoring and/or data gathering components can use an extension 140 (e.g., a Dynamic Monitoring System Diagnostic Framework extension) to access and use the data gathering volumes provided by the diagnostic framework to monitor for and obtain diagnostic information regardless whether the diagnostic monitoring component is being used. For example, a monitoring system 144 (e.g., a dynamic monitoring system (DMS)) extension can plug in monitoring system specific actions (DMS Actions) 142 that are used to obtain diagnostic information at the application server and/or the application server components regardless of whether the diagnostic monitoring component is being used or is enabled.

In accordance with an embodiment, a console 150 can be used to access the diagnostic image file using an image manager 152 (e.g., a Weblogic Scripting Tool Image Manager). The console can be a web interface (e.g., WebLogic Server Console), a scripting interface (e.g., WebLogic Server Scripting Tool), or another form of interface. In accordance with an embodiment, functions (e.g., Weblogic Scripting Tool functions) can be provided which can list available captured images and provide the ability to access the named images and named entries within them to named local files. For example, WLST function String [ ] getAvailableCapturedImages( ) returns an array of image names which identify the images and can include the file name of the image excluding the path. WLST function string saveDiagnosticImageCaptureFile(imageName, outputFile=None) can provide the ability to access the name images, where imageName is a String valued retrieved by getAvailableCapturedImages( ) and outputFile is the name of the local file to create which contains the diagnostic image capture data. In the defaulted case, the output file name can be the same as the imageName param on the client machine in the working directory of WLST, i.e., ./imageName.

Capture Diagnostic Information from a Diagnostic Monitoring Component

Figure 2:
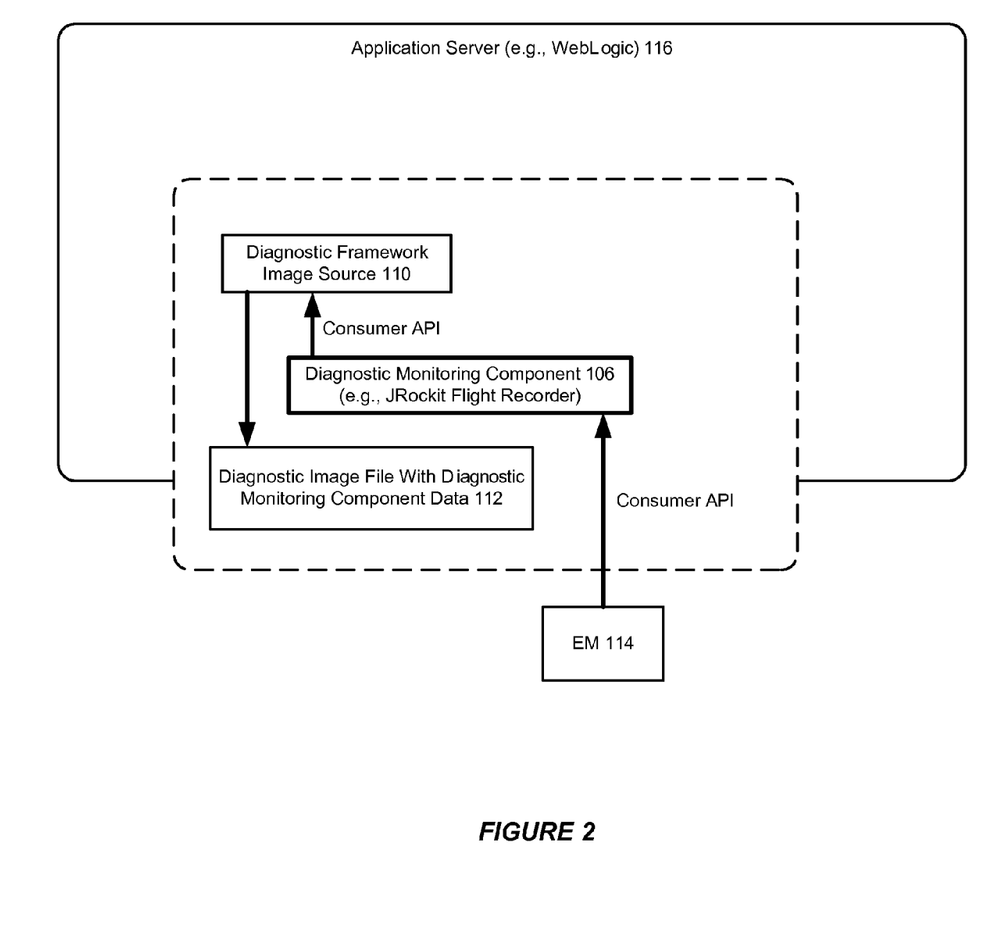
FIG. 2 shows an exemplary diagnostic system for providing diagnostic information between an application server and a virtual machine or other system in accordance with an alternate embodiment.

FIG. 2 is an illustration of a diagnostic framework (e.g., a WebLogic Diagnostic Framework (WLDF) or another type of diagnostic framework) for capturing diagnostic information from a diagnostic monitoring component, such as JRockit Flight Recorder, into a diagnostic image file. In accordance with an embodiment, the diagnostic information about a virtual machine can be gathered and recorded by the JRockit Flight Recorder at the virtual machine level, or provided to the diagnostic monitoring component by other producers of diagnostic information (such as other application servers or a virtual machine) using a producer API. The diagnostic information obtained and recorded by the JRockit Flight Recorder at the virtual machine level depends on a data gathering volume selected for the diagnostic monitoring component. In accordance with an embodiment, the data gathering volume of the diagnostic monitoring component can be set in either a default volume; full volume; disabled volume; or tailored volume.

The diagnostic information obtained and recorded by the WLDF diagnostic framework, similarly depends on a diagnostic framework data gathering volume. The data gathering volume of the diagnostic framework can be set in an off volume; low (default) volume; medium volume; or high volume.

In accordance with an embodiment, a consumer API such as a JRockit Flight Recorder API can be used to capture the diagnostic information at the diagnostic monitoring component provided from the virtual machine or from the diagnostic framework into a diagnostic framework image source, which can then be persisted into a diagnostic image file. The diagnostic information captured from the diagnostic monitoring component can be supplied to the diagnostic image file as a separate file having a file name of, e.g., "JRockitFlightRecorder.jfr" along with the diagnostic information provided directly from the diagnostic framework. The diagnostic image file then contains the diagnostic information from JRockit Flight Recorder, and the diagnostic information provided by WLDF. In accordance with an embodiment, the data from the diagnostic monitoring component can be defined in a unique format, e.g., a JRockit format, which can be directly consumed by tools understanding that format and can contain all available diagnostic information from the diagnostic monitoring component.

Provide Diagnostic Information to a Diagnostic Monitoring Component

Figure 3:
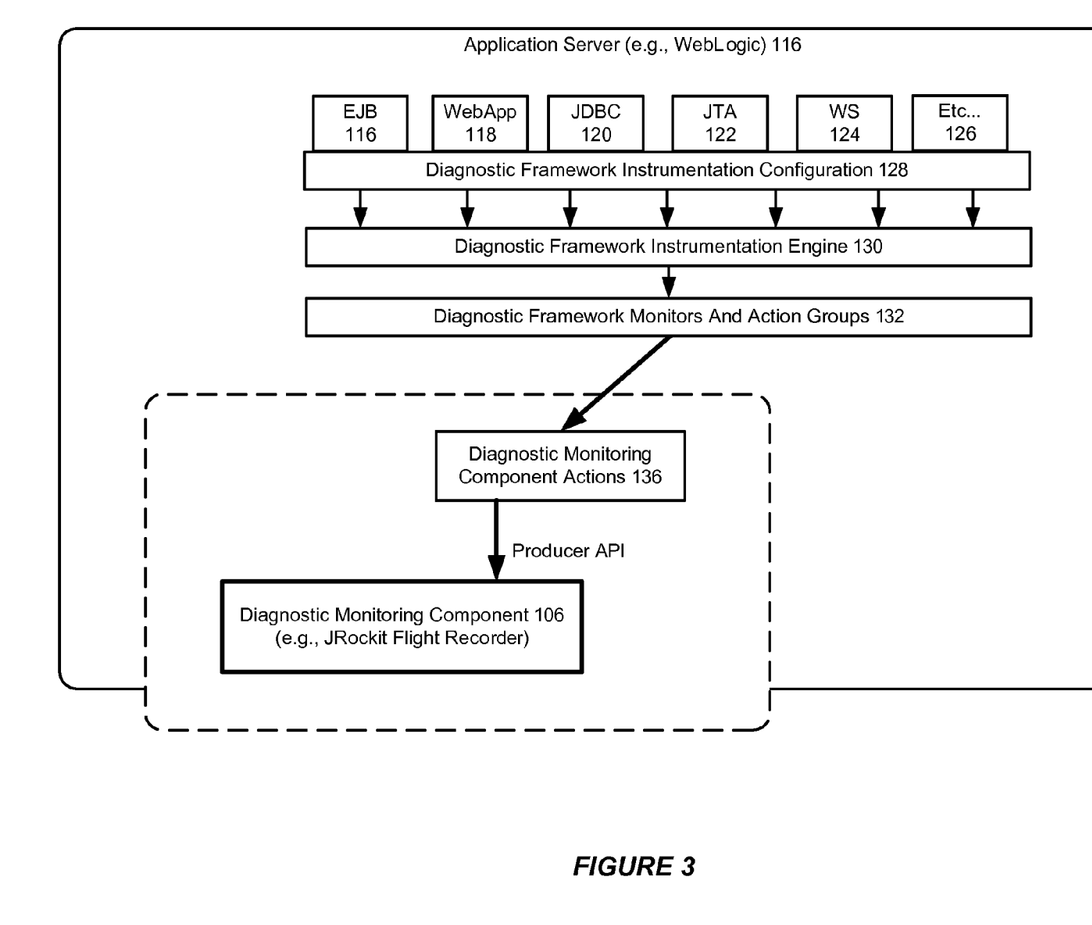
FIG. 3 shows an exemplary diagnostic system for providing diagnostic information between an application server and a virtual machine or other system in accordance with an alternate embodiment.

FIG. 3 is an illustration of a diagnostic framework (e.g., the WebLogic Diagnostic Framework (WLDF) or another type of diagnostic framework) for providing diagnostic information from an application server (e.g., Weblogic or another application server), application server components and/or other components to a diagnostic monitoring component. In accordance with an embodiment, a diagnostic monitoring component producer API, e.g., a JRockit Flight Recorder API, can be used by the diagnostic framework, e.g., WLDF, to provide diagnostic information to the diagnostic monitoring component from other sources, such as an application server, application server components and/or enterprise manager (EM) obtained from a diagnostic framework.

The diagnostic information obtained and recorded by the WLDF diagnostic framework depends on a diagnostic framework data gathering volume.

For example, when the WLDF diagnostic framework data gathering volume is set in an off volume, no data is gathered or recorded from the application server and/or application server components.

When the WLDF diagnostic framework data gathering volume is set in a low (default) volume, data marked as low volume will be gathered and recorded from the application server and/or the application server components. Automatic severity based message recording will automatically record emergency, alert and critical messages that are logged.

When the WLDF diagnostic framework data gathering volume is set in a medium volume, data marked as low and medium will be gathered and recorded from the application server and/or application server components. Automatic severity based message recording will automatically record error level and above messages that are logged.

When the WLDF diagnostic framework data gathering volume is set in a high volume, data marked as low, medium and high volumes will be gathered and recorded from the application server and/or application server components. Automatic message based recording will not gather additional detail over what is gathered at medium volume, and will automatically record error and above messages that are logged.

In accordance with an embodiment, the diagnostic framework data gathering volume can be dynamically changed from one data gathering volume to another data gathering volume to change the scope of data gathered without having to restart the application server. In other words, the diagnostic volume setting is dynamic. By changing the diagnostic volume, the scope of collected diagnostic data can be changed without requiring the application server to be restarted.

In accordance with an embodiment, WLDF uses a WLDF-ServerDiagnosticMBean which can be extended to provide configuration to control the diagnostic framework diagnostic volume. For example, the WLDFServerDiagnosticMBean can be extended to include:

```
public String OFF_VOLUME="Off";
public String LOW_VOLUME="Low";
public String MEDIUM_VOLUME="Medium";
public String HIGH_VOLUME="High";
/**
* <p>Specifies the volume of diagnostic data that is
automatically
produced by WebLogic Server at run time.
* Note that the WLDF diagnostic volume setting does not affect explicitly
configured diagnostic modules.
* For example, this controls the volume of events generated for JRockit
Flight Recorder.</p>
* <p>This attribute has the following settings:</p>
* <ul>
* <li><code>Off</code> No diagnostic data is produced.</li>
* <li><code>Low</code> Minimal amounts of automatic diagnostic
data are
produced. This is the default.</li>
* <li><code>Medium</code> Additional diagnostic data is automatically
generated beyond the amount generated for <code>Low</code>.</li>
* <li><code>High</code> Additional diagnostic data
is automatically
generated beyond the amount generated for <code>Medium</code>.</li>
* </ul>
* @dynamic true
* @return The diagnostic volume
*/
public String getWLDFDiagnosticVolume( );
/**
* <p>Specifies the volume of diagnostic data that is automatically
produced by WebLogic Server at run time.
* Note that the WLDF diagnostic volume setting does not affect explicitly
configured diagnostic modules.
* For example, this controls the volume of events generated for JRockit
Flight Recorder.</p>
* <p>This attribute has the following settings:</p>
* <ul>
* <li><code>Off</code> No diagnostic data is produced.</li>
* <li><code>Low</code> Minimal amounts of automatic
diagnostic data are
produced. This is the default.</li>
* <li><code>Medium</code> Additional diagnostic data is automatically
generated beyond the amount generated for <code>Low</code>.</li>
* <li><code>High</code> Additional diagnostic data is automatically
generated beyond the amount generated for <code>Medium</code>.</li>
* </ul>
* @param mode Specifies the diagnostics volume
* @see #getWLDFDiagnosticVolume
* @default WLDFServerDiagnosticMBean.LOW_VOLUME
* @legalValues WLDFServerDiagnosticMBean.OFF_VOLUME,
WLDFServerDiagnosticMBean.LOW_VOLUME,
WLDFServerDiagnosticMBean.MEDIUM_VOLUME,
WLDFServerDiagnosticMBean.HIGH_VOLUME
*/
public void setWLDFDiagnosticVolume(String volume);
```

In accordance with an embodiment, diagnostic framework instrumentation related enhancements, such as server managed monitors, actions groups, actions and instrumentation configuration is provided by the diagnostic framework to support integration of the diagnostic monitoring component with the diagnostic framework. For example, instrumentation related enhancements can be used to modify application server component classes and/or add additional code to get information about application server component behavior, e.g., to find out how an EJB is performing. The diagnostic framework identifies places in the application server components by named entities called monitors, which identifies a point of code entry in the application sever component, and an action identifies the structure of the code.

In accordance with an embodiment, diagnostic framework server managed monitors (e.g., WLDF monitors) are provided by the diagnostic framework to support integration of the diagnostic monitoring component with the diagnostic framework. These server managed monitors can be available at the server level configuration, regardless of whether there is a diagnostic module enabled. The enablement of these monitors is controlled using the diagnostic framework data gathering volume, and the data gathering level specified for the monitor. A Boolean attribute "server-managed" can be added to the server managed monitor in the instrumentation configuration (e.g., WLDF instrumentation configuration). This setting allows system scoped monitors to indicate if they should be managed by the server configuration even when no diagnostic modules are configured or used. The default Boolean attribute is set to false. A setting of true can only be applied to monitors of server scope, and indicates that the monitor is always available to be enabled (based on the diagnostic framework diagnostic volume) regardless of whether the diagnostic framework system is enabled/disabled. A string attribute "diagnostic-mode" can be added to the monitor in the instrumentation configuration. This setting allows the monitor to indicate which diagnostic volume it can automatically be included in.

In accordance with an embodiment, action groups provided by the diagnostic framework allow other data gathering components (e.g., a Dynamic Monitoring System Diagnostic Framework extension) to use an extension to access and use the data gathering volumes provided by the diagnostic framework to monitor for, and obtain diagnostic data, regardless whether the diagnostic monitoring component is being used. For example, a monitoring system (e.g., a dynamic monitoring system (DMS)) extension can plug in monitoring system specific actions at the same points used by the diagnostic framework and capture diagnostic data regardless of whether the diagnostic monitoring component is being is enabled. In accordance with an embodiment, example action groups can be one of DataGatheringStatelessActions and DataGatheringAroundActions, and can be used to allow extensions to use the monitors.

In accordance with an embodiment, actions provided by the diagnostic framework can be provided to retrieve diagnostic data from the application server and/or the application server components, and supply the data to the diagnostic monitoring component. In accordance with an embodiment, example actions include FlightRecorderAroundAction and FlightRecorderStatelessAction, and can be added into the corresponding action group.

In accordance with an embodiment, instrumentation configuration includes instrumentation grammar to provide a means to mark specific arguments and return values as being recorded. Additionally, the instrumentation grammar does not expose arguments or return values to actions by default. The instrumentation grammar can also mark specific arguments and return values as being allowed to be supplied to actions. Further, the instrumentation grammar can specify a custom Value Renderer for rendering arguments and return values of specified types.

In accordance with an embodiment, the instrumentation configuration schema can be extended to add optional wls-value-renderers, which is an optional list of custom Value Renders which can be used in the instrumentation configuration. A Value Render has a name, and the classname of the class which implements the ValueRenderer interface. Optionally the Value Render may specify the classname of the Type it should be used for if it is a type based Value Renderer. For example:

```
<wls-value-renderers>
    <wls-renderer name="FooNoType"
    className="com.oracle.bar.Foo"/>
    <wls-renderer name="FooBarType"
    className="com.oracle.bar.FooBar"
typeClassName="com.oracle.bar.Bar"/>
</wls-value-renderers>
```

The ValueRenderer can be used to transform parameter values, return values, and the "this" value supplied to all actions in the Joinpoint. This applies to all actions, including existing instrumentation actions. In accordance with an embodiment, diagnostic framework internals can supply a default value renderer which can return the either the original Object, or a transformed Object. The default value render will always be applied before custom renderers are applied. The default renderer will always honor the "sensitive" status of a value (default) by simply returning a special string. Custom value renderers are not required but add flexibility for rendering more complex values which are gathered and recorded.

In accordance with an embodiment, meta-operators are provided to the instrumentation configuration grammar for the Pointcut expression language which can be specified for the class, param's, and returnSpec's to indicate special processing. For example, the new meta-operators can include:
  # [p-name] Indicates the "this" for a non-static instance of a class, a param, or returnSpec can be captured and recorded. The p-name is optional and can be used to specify the parameter name for explicit parameters, this is useful when symbol names are not present in the class file. The p-name is not allowed for return values, "this", or "..." parameters. The name is used in events supplied to the flight recorder to describe the value.
  % Indicates the "this" for a non-static instance of a class, a param, or returnSpec does not contain sensitive data and will be made available to actions.
  ~name Indicates that the ValueRenderer specified using the alias "name" should be used to render the value. In the situation where a type based value renderer would be used, this will override that and use the specified value renderer.
The default ValueRenderer can be applied to all values first. Custom renderers may be applied in addition, but they will be applied after the default renderer has been applied and must be defensively coded to check whether the object being supplied has been transformed (i.e., a custom renderer must not assume it is still the original type).

In accordance with an embodiment, the order in which a custom ValueRenderer is chosen is as follows: (1) if a named ValueRenderer is specified for a param or returnSpec, that ValueRenderer is used to render the value, (2) if a type-based ValueRenderer matches a param or returnSpec, that ValueRenderer is used to render the value. In accordance with an embodiment, if a value is "sensitive", "sensitive" always is honored and the value is not rendered. For example, if an argument is sensitive (default) and has both "#", and "~name", the # and ~name will be ignored.

In accordance with an embodiment, if more than one type based ValueRenderer can match a param or returnSpec, the most specific ValueRenderer will be used if one can be determined. In cases where this cannot be determined, the behavior in terms of which specific ValueRenderer is used to render the value will be undefined and one ValueRenderer will be selected. For example, provided that ClassA implements InterfaceX and InterfaceY, and provided that type based ValueRenderers for InterfaceX and InterfaceY is provided, then either ValueRenderer could match.

The diagnostic data to be gathered can be added to the Joinpoint that is supplied to the actions. The order in which parameter names supplied to diagnostic monitoring component events are determined as follows: (1) if an explicit parameter name was specified in the instrumentation configuration that will be used, (2) if no name was specified in the instrumentation configuration, and there is a symbolic name available for the parameter the symbolic name will be used, otherwise a name will be generated: "param_"+parameter-index+"_"+param-.

In accordance with an embodiment, messages associated with events produced by the application server and/or application server components can provide information about what occurs at runtime. The ability to select specific messages to record can be used to add valuable context into the diagnostic monitoring component using existing information. Additionally, being able to have messages recorded based on their severity level and the diagnostic framework data gathering volume adds valuable context. For example, a broad set of important messages can be recorded without making any changes to the message catalog and messages can be recorded not in the message catalog.

In accordance with an embodiment, the diagnostic framework can specify a message as a diagnostic monitoring component message in the message catalog, and/or automatically record messages based on severity. For example, the message catalog can be extended to allow specific messages to be marked as being gathered and recorded by the diagnostic monitor component. Messages of any severity level can be marked in the message catalog with diagnosticmode="low" to indicate they should be recorded if logged and if the diagnostic volume for the server matches. In accordance with an embodiment, diagnosticmode (off|default|medium|high) "off" can be added to the msgcat.dtd to add an optional string attribute named "diagnosticmode" to the logmessage element, which defaults to "off". Recording can be detected when the message is logged. In accordance with an embodiment, an example logged message is:

```
<logmessage
    messageid="123456"
    severity="info"
    method="logSomethingInteresting( )"
    methodtype="getter"
    diagnosticmode="low">
    <messagebody> ...</messagebody>
    <messagedetail>...</messagedetail>
    <cause>... </cause>
    <action>... </action>
</logmessage>
```

In accordance with an embodiment, the diagnostic framework can automatically record messages of specific severity levels, based on the diagnostic framework data gathering volume setting. Messages with a level of "emergency", "alert", or "critical" can be recorded at diagnostic volumes: low, medium, and high. Messages with a level of "error" or higher can be recorded at diagnostic volumes: medium, and high. In accordance with an embodiment, the recording of messages based on their severity takes precedence over the specific diagnosticmode attribute in the message catalog. For example, if an "emergency" message is marked with diagnosticmode="off", the emergency message can still be recorded. Setting the Diagnostic Volume on the WLDF-ServerDiagnosticMBean to "off" can disable recording messages based on severity.

Figure 4:
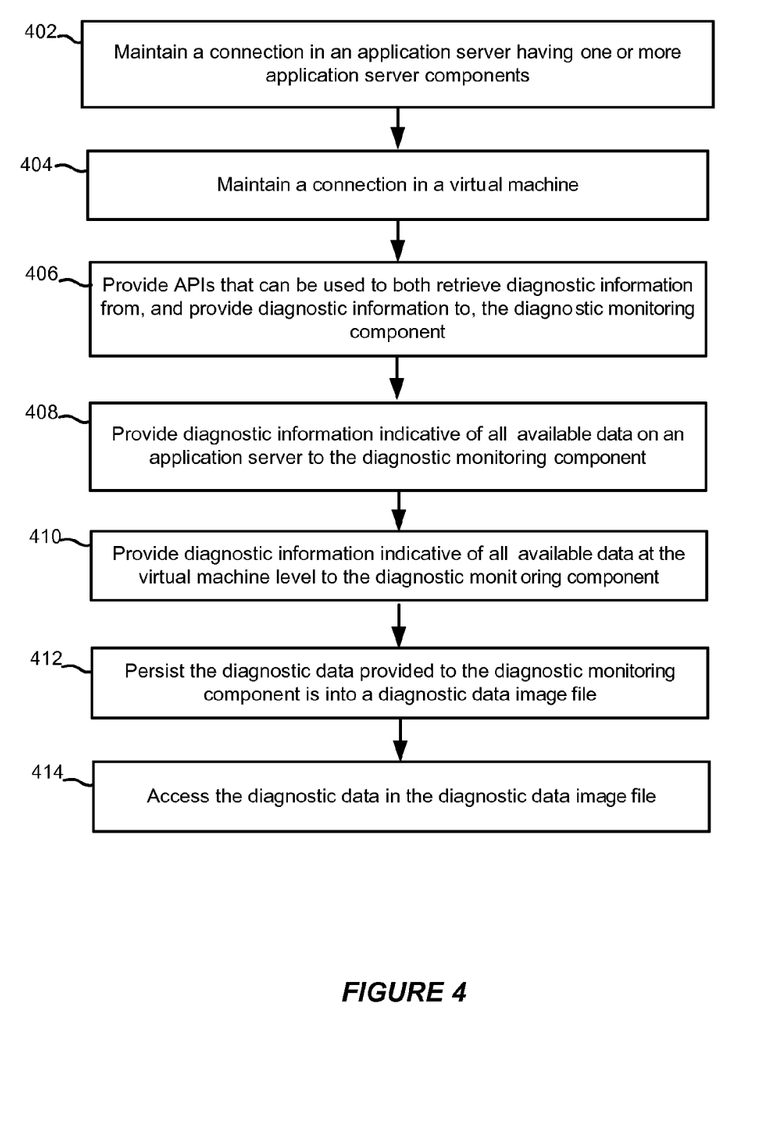
FIG. 4 shows a flow chart of a method in accordance with an embodiment, for providing diagnostic information between an application server and a virtual machine or other system.

FIG. 4 shows a flow chart of a method in accordance with an embodiment, for providing diagnostic information between an application server and a virtual machine or other system. At step 402, a connection to an application server (e.g., a Weblogic application server or another application server) having one or more application server components is maintained. At step 404, a connection to a virtual machine (e.g., a JRockit virtual machine) is maintained. The virtual machine gathers diagnostic information at the virtual machine level about the application server and/or the application server components. For example, the diagnostic information obtained at the virtual machine level depends on a data gathering volume selected for a diagnostic monitoring component. When the data gathering volume of the diagnostic monitoring component is set in a default volume, non-intrusive diagnostic information will be gathered and recorded by the diagnostic monitoring component at the virtual machine level, in addition to diagnostic information supplied by other producers of data. When the data gathering volume is set in a full volume, all diagnostic information will be gathered and recorded at the virtual machine level. This includes information from other producers of diagnostic information such as application servers and/or application server components. When the data gathering volume is set in a disabled volume, no diagnostic information will be gathered at the virtual machine level, and no diagnostic information will be recorded by other producers that supply diagnostic information. When the data gathering volume is set in a tailored volume, this allows additional virtual machine modules to be specified to gather data for the diagnostic monitoring device. This is in addition to what is gathered by any other virtual machine, e.g., JRockit Virtual Machine in the default volume.

At step 406, APIs are provided that can be used to both retrieve diagnostic information from, and provide diagnostic information to, the diagnostic monitoring component. For example, a consumer API is provided that can be used to capture diagnostic information from a diagnostic monitoring component into a diagnostic framework image source, which can then be persisted into a diagnostic image file on a computer readable storage medium or another type of medium. A producer API can be used by the diagnostic framework to provide diagnostic information to the diagnostic monitoring component from other sources, such as an application server, application server components and/or enterprise manager (EM).

At step 408, diagnostic information indicative of all available data on an application server including diagnostic information from the one or more application server components is provided to the diagnostic monitoring component. At step 410, diagnostic information indicative of all available data at the virtual machine level is provided to the diagnostic monitoring component using the producer API. At step 412, the diagnostic data provided from the application server, application server components, and the virtual machine to the diagnostic monitoring component is persisted into a diagnostic data image file.

In accordance with an embodiment, the diagnostic information obtained from the diagnostic monitoring component can be defined in a unique format, e.g., a JRockit format, which can be directly consumed by tools understanding that format. In accordance with an embodiment, the diagnostic image file can contain both diagnostic information from the diagnostic monitoring component and diagnostic information obtained from a diagnostic framework. The diagnostic information obtained and recorded by the diagnostic framework can depend on a diagnostic framework data gathering volume. For example, the diagnostic framework data gathering volume can be set in an off, low, medium and high volume, which controls the amount of data recorded from the application server, application server components and/or other data recording components by the diagnostic framework.

At step 414, the diagnostic information can be accessed, e.g., remotely or locally by other component. Additionally or alternatively, the diagnostic image file can be transmitted to an external component, such as an external diagnostic program or external monitor, to be analyzed. In accordance with an embodiment, the diagnostic image file can be copied in its entirety or a specific entry from within the diagnostic image can be copied to the external component or some other component. In accordance with an embodiment, a console can be used to remotely access the diagnostic image file having diagnostic information. The console can be a web interface (e.g., WebLogic Server Console), a scripting interface (e.g., WebLogic Server Scripting Tool), or another form of interface, and can used to copy the diagnostic image file on the application server or another producer which captured the diagnostic image file. Alternatively, the diagnostic image file can be accessed directly from the producer which captured the diagnostic image file.

Method Memory Allocation Actions

In accordance with an embodiment, a virtual machine (e.g., a JRockit JVM) can be used to track the total amount of memory allocated by a thread at the application server and provides an internal API to access this information. Diagnostic framework instrumentation can integrate with this API to track the memory allocated within method calls. In accordance with an embodiment, TraceMemoryAllocationAction and MethodMemoryAllocationStatisticsAction are actions which call the diagnostic monitoring component API to track memory allocation per method within the same thread. In accordance with an embodiment, TraceMemoryAllocationAction uses the diagnostic monitoring component API to trace the number of bytes allocated by that thread during a method call and can be used from Delegating and Custom Monitors. In accordance with an embodiment, MethodMemoryAllocationStatisticsAction uses the diagnostic monitoring component API that tracks the number of bytes allocated by that thread during a method call. Statistics will be kept, e.g., count, min, max, avg, sum, sum_of_squares, and std_deviation statistics, in-memory on the memory allocations. In accordance with an embodiment, the statistics are available through the WLDFInstrumentationRuntimeMBean when the diagnostic monitoring component is available.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing diagnostic information between an application server and a virtual machine, comprising:
   a computer with one or more microprocessors;
   a first diagnostic component, running on the computer, wherein the first diagnostic monitoring component
      is adapted to continuously record system activities on a virtual machine such as to hold a first diagnostic data preceding a system failure on the virtual machine, and
      includes an application programming interface (API) for transferring information to and from the first diagnostic monitoring component;
   a second diagnostic component, executing on the computer and separate from the first diagnostic component, wherein the second diagnostic component obtains a second diagnostic data from an application server and one or more application server components associated therewith, wherein the second diagnostic component
      provides a subset of the second diagnostic data to the first diagnostic component using the API, wherein the subset of the second diagnostic data provides a context for interpreting the first diagnostic data,
      provides therein a diagnostic image source for the first diagnostic component, wherein the diagnostic image source serves as a direct source for, and enables a production of, a diagnostic image file,
      captures the first diagnostic data and the subset of the second diagnostic data from the first diagnostic component into the diagnostic image source using the API, and
      persists the diagnostic data in the diagnostic image source into a diagnostic image file; and
   a console that provides access to the diagnostic image file.

2. The system of claim 1, wherein the first diagnostic component is a JRockit Flight Recorder.

3. The system of claim 1, wherein the virtual machine is a JRockit virtual machine.

4. The system of claim 1, wherein the one or more application server components include at least one of a web application, EJB, JDBC, JTA and WS.

5. The system of claim 1, wherein the first diagnostic data obtained by the first diagnostic component depends on a data gathering volume selected from one of a default volume, a full volume, a disabled volume and a tailored volume.

6. The system of claim 5, wherein the diagnostic volume setting is dynamic, and wherein upon changing the diagnostic volume, a scope of collected diagnostic data is changed without requiring the application server to be restarted.

7. The system of claim 6, wherein data gathered in the default volume includes non-intrusive diagnostic information, the data in the full volume includes all diagnostic information, and no data is gathered in the disabled volume.

8. The system of claim 1, wherein monitors and actions groups are provided that allow other data gathering components to use an extension to access the diagnostic information provided by the application server and the application server components.

9. The system of claim 1, wherein the first diagnostic data includes statistics on memory allocations for a thread and for one or more methods calls in that thread on the virtual machine.

10. A method for providing diagnostic information between an application server and a virtual machine, comprising the steps of:
    providing a first diagnostic component running on one or more microprocessors, wherein the first diagnostic component
       is adapted to continuously record system activities on a virtual machine such as to hold a first diagnostic data preceding a system failure on the virtual machine, and
       includes an application programming interface (API) for transferring diagnostic information to and from the first diagnostic component;
    providing a second diagnostic component separate from the first diagnostic component, wherein the second diagnostic component obtains a second diagnostic data from an application server and one or more application server components associated therewith;
    providing a subset of the second diagnostic data to the first diagnostic component using the API, wherein the subset of the second diagnostic data provides a context for interpreting the first diagnostic data;
    providing, in the second diagnostic component, a diagnostic image source for the first diagnostic component, wherein the diagnostic image source serves as a direct source for, and enables a production of, a diagnostic image file;
    capturing the first diagnostic data and the subset of the second diagnostic data from the first diagnostic component into the diagnostic image source using the API;
    persisting the diagnostic data in the diagnostic image source into a diagnostic image file; and
    accessing the diagnostic data image file via a console.

11. The method of claim 10, wherein the first diagnostic component is a JRockit Flight Recorder.

12. The method of claim 10, wherein the virtual machine is a JRockit virtual machine.

13. The method of claim 10, wherein the second diagnostic component accepts diagnostic data from other sources other than the application server.

14. The method of claim 10, wherein the one or more application server components include at least one of a web application, EJB, JDBC, JTA and WS.

15. The method of claim 10, wherein the first diagnostic data and the second diagnostic data are obtained in a
    default volume, wherein non-intrusive data will be gathered and recorded by the virtual machine, as well as data supplied by other producers of diagnostic information;

full volume, wherein all data will be gathered and recorded by the virtual machine;

disabled volume, wherein no data will be gathered by the virtual machine; and wherein the data gathering volume is capable of being dynamically changed.

16. The method of claim 10, wherein the first diagnostic data includes statistics on memory allocations for a thread and for one or more methods calls in that thread on the virtual machine.

17. The method of claim 10, wherein monitors and actions groups are provided that allow other data gathering devices to use an extension to access the data gathering volumes provided by the second diagnostic component to monitor for and obtain diagnostic information.

18. A non-transitory computer readable storage medium including instructions stored thereon which, when executed by a computer, cause the computer to perform the steps comprising:

providing a first diagnostic component running on one or more microprocessors, wherein the first diagnostic component
is adapted to continuously record system activities on a virtual machine such as to hold a first diagnostic data preceding a system failure on the virtual machine, and
includes an application programming interface (API) for transferring diagnostic information to and from the first diagnostic component;

providing a second diagnostic component separate from the first diagnostic component, wherein the second diagnostic component obtains a second diagnostic data from an application server and one or more application server components associated therewith;

providing a subset of the second diagnostic data to the first diagnostic component using the API, wherein the subset of the second diagnostic data provides a context for interpreting the first diagnostic data;

providing, in the second diagnostic component, a diagnostic image source for the first diagnostic component, wherein the diagnostic image source serves as a direct source for, and enables a production of, a diagnostic image file;

capturing the first diagnostic data and the subset of the second diagnostic data from the first diagnostic component into the diagnostic image source using the API;

persisting the diagnostic data in the diagnostic image source into a diagnostic image file; and accessing the diagnostic data image file via a console.

19. The non-transitory computer readable storage medium of claim 18, wherein the first diagnostic data obtained by the first diagnostic component depends on a data gathering volume selected from one of a default volume, a full volume, a disabled volume and a tailored volume.

20. The non-transitory computer readable storage medium of claim 18, wherein the first diagnostic data includes statistics on memory allocations for a thread and for one or more methods calls in that thread on the virtual machine.

* * * * *

UNITED STATES PATENT AND TRADEMARK OFFICE
CERTIFICATE OF CORRECTION

Page 1 of 1

PATENT NO.         : 8,645,764 B2
APPLICATION NO.    : 13/111612
DATED              : February 4, 2014
INVENTOR(S)        : Inamdar et al.

It is certified that error appears in the above-identified patent and that said Letters Patent is hereby corrected as shown below:

In the Drawings:

On Sheet 4 of 4, in figure 4, under Reference Numeral 410, line 2, delete "monit oring" and insert -- monitoring --, therefor.

In the Specification:

In column 6, line 8, delete "sever" and insert -- server --, therefor.

Signed and Sealed this
Twenty-fourth Day of June, 2014

Michelle K. Lee
*Deputy Director of the United States Patent and Trademark Office*